Patented Dec. 3, 1935

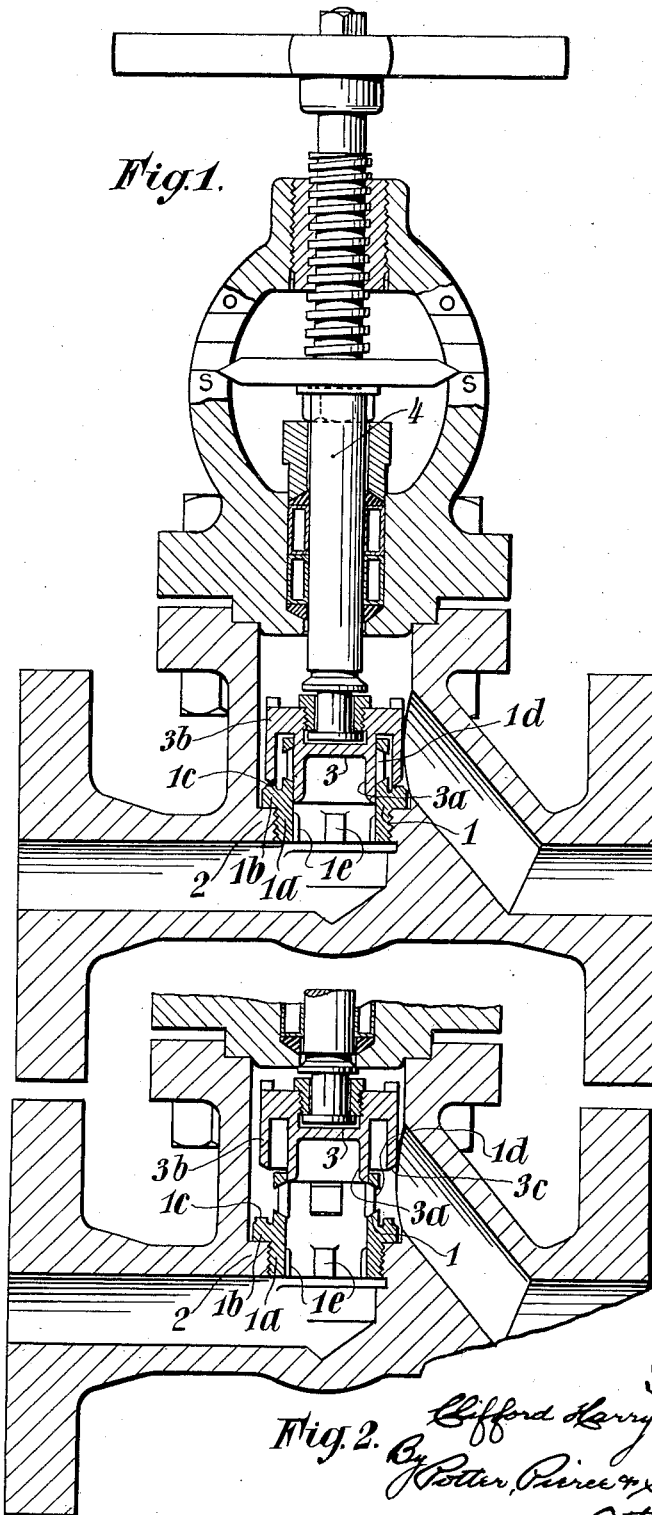

2,023,350

UNITED STATES PATENT OFFICE 2,023,350

VALVE

Clifford Harry Armstrong, Hendon, England, assignor of one-half to Sir John Dewrance, Southwark, England Application August 14, 1935, Serial No. 36,172
In Great Britain March 19, 1934

2 Claims. (Cl. 251—28)

This invention relates to screw-down and other valves of the kind in which the valve member comprises an inverted cup-like piston member arranged so as to prevent flow of fluid until the seating faces are separated to a sufficient extent to avoid a corrosive or cutting action on the seating faces, and is particularly concerned with valves of this type in which the stationary seating is arranged around a sleeve projecting above the seating and having ports opening at a level above the seating face, such sleeve being adapted to cooperate with the piston in such manner that the ports are not uncovered thereby until the seating faces are separated.

According to the present invention the ports in the sleeve converge in an outward direction towards the stationary seating, such ports preferably being of rectangular formation and having their upper and lower edges bevelled to form convergent passages, thereby further shielding both the fixed and movable seating faces.

The invention is hereinafter described by way of example with reference to the accompanying drawing, in which:—

Figure 1 is a longitudinal section of a screw-down stop valve in accordance with the invention; and Figure 2 is a part longitudinal section similar to Figure 1 showing the valve in the open position.

In carrying the invention into effect according to one embodiment, in the application of the invention for example to a screw-down stop valve, a sleeve 1 is provided at its lower part with an externally screw-threaded portion 1a adapted to screw into a corresponding bore in the usual horizontal partition 2 of the valve and is further formed with an external flange 1b the upper face of which is adapted to constitute the stationary seating 1c. The sleeve 1 extends upward beyond such seating 1c and in such upwardly extending portion ports 1d are provided which open out above the level of the said seating 1c. The sleeve 1 may have internal lugs 1e preferably adjacent its lower end for screwing it into or out of position. The valve member 3, which is connected in any suitable manner to the vertical lift spindle 4, consists substantially of an inverted cup-like piston having a cylindrical wall 3a slidable within the bore of the sleeve 1 so as to close the ports 1d therein when the valve is shut (as shown in Figure 1) and an outer concentric annular wall or flange 3b which, when the valve is shunt, surrounds the ported extension of the sleeve 1 and at its lower edge provides a seating 3c for cooperation with the stationary seating 1c. The piston 3a extends downwardly below the level of the seating 3c on the concentric annular wall or flange 3b and is arranged so that the seating faces 1c, 3c are separated to a substantial extent before the piston 3a uncovers the ports 1d in the sleeve 1 (as shown in Figure 2). Thus, the seatings 1c, 3c are not subject to the corrosive or cutting action of the fluid and a more durable and efficient valve is obtained. The ports 1d in the sleeve 1 are of rectangular form and their upper and lower edges are bevelled as shown so as to form outlet passages which taper in an outward direction in order to cause the fluid to issue in convergent streams or jets, thus further shielding the seatings 1c, 3c from the corrosive or cutting action of the fluid. The outer annular wall or flange 3b of the valve member may be formed integrally with the piston or may be constituted by a separate member screwed or otherwise suitably attached thereto.

What I claim and desire to secure by Letters Patent is:—

1. In a valve, the combination with a body portion having inlet and outlet passages, a valve seating, and a sleeve within said seating and projecting above the same, said sleeve having openings therethrough providing ports above the level of the valve seating, opposed portions of the walls of the said sleeve openings converging in the direction of fluid flow through the said openings, of a valve member comprising an inverted cup-like piston slidable within said sleeve to control said ports and an outer annular flange having a lower face cooperating with said valve seating the said piston extending substantially below the lower edges of said ports when the valve is closed, whereby said outer annular flange is separated from said valve seating prior to the uncovering of said ports by said piston when the valve member is moved towards open position.

2. A valve as claimed in claim 1, wherein said openings are of rectangular cross-section, and the upper and lower edges of said openings are beveled towards each other in the direction of fluid flow.

CLIFFORD HARRY ARMSTRONG.